July 17, 1934.  W. BEARD  1,966,842
MACHINERY BELT FASTENER
Filed Oct. 14, 1932
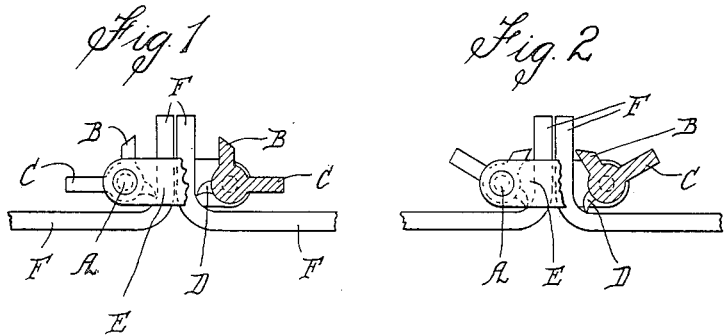
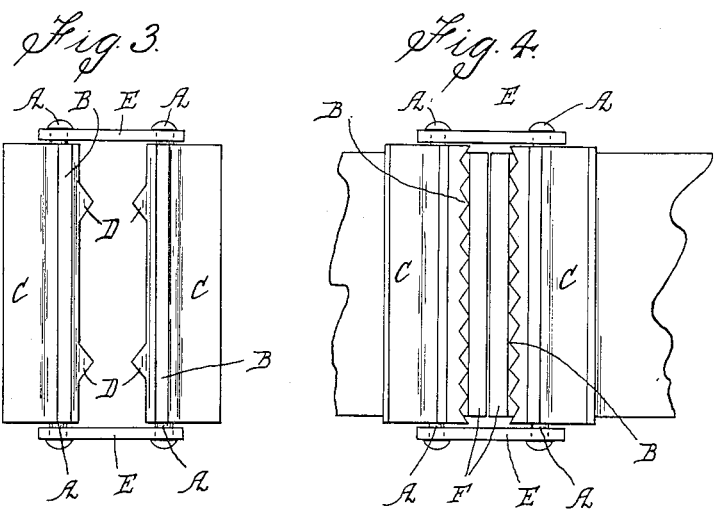
Inventor:
Walter Beard
By Emil Bomelycke
Attorney Patented July 17, 1934

1,966,842

UNITED STATES PATENT OFFICE 1,966,842

MACHINERY BELT FASTENER

Walter Beard, Auckland, New Zealand

Application October 14, 1932, Serial No. 637,851
In New Zealand July 26, 1932

2 Claims. (Cl. 24—31)

This invention has been devised with the object of providing an improved construction of fastener for connecting together the two ends of a machinery driving belt, of the known type in which the two ends, brought together, so that their inner sides are face to face, are held between two clamping plates which bind them together and effect a grip thereon that is obtained and maintained by the strain on the belt.

The invention consists in a new form of clamping plate and in the manner and means by which the two plates are held in parallel relationship to effect their clamping and gripping actions upon the belt ends.

These features of construction are shown in the accompanying drawing, in which:—

Figure 1 is a side elevation, half being in section, of the fastener with the belt ends loosely inserted therein.

Figure 2 is a similar view but showing the belt ends gripped.

Figure 3 is a plan of the fastener, open.

Figure 4 a plan of the fastener, closed.

In giving effect to the invention each clamping plate is formed of approximately right angular cross sectional shape with a pivot bearing pin A extending longitudinally from each end, at its angle. One member B of this plate forms the gripping edge and this is made of any desired width and preferably has its edge serrated, or sharpened, as shown, in order to increase its gripping action. The other member C is of plain nature and forms the lever by means of which the plate may be turned on its pivots in the circumstances surrounding its use. It also is made of any approved width. The plate is made of a length such as to correspond with the width of belt for which the fastener is designed to be used. The gripping member B may, if desired, be shorter than the main member C.

In addition, the plate is made with two or more points D projecting from its external angle in about the line of the member C and these may be given a slight downward curve. These are disposed at approved distances apart along the length of the plate.

The two plates used in the fastener are arranged in parallel lines so that the members C extend out in opposite directions and are connected together at each end by means of the link E in which the pivot pins A of the respective plates are journalled and secured. These links thus hold the plates in parallel relationship so that they may turn on their pivots to cause the gripping members B to move together or apart. The pivots are disposed at a distance apart relatively to the width of the members B and to the combined thickness of the two belt ends to be engaged such that when the gripping members are turned parallel the space between exceeds the combined thickness of the belt ends, and when the members are turned in towards each other, the space between is less than such thickness.

In the use of the fastener therefore, the belt ends F are brought together face to face and are then passed upwardly between the plates, as in Figure 1, when the members B are upright and the points D extend inwardly against the belt surfaces. The belt ends are drawn through the fastener in this manner, sufficiently to adjust the length to that which is required. The strain is then placed on the belt and this causes the plates to be turned on their pivots, by reason of the points D engaging with the belt, and the gripping edges to be turned in on to the belt ends and then by engagement therewith as the strain is increased, to clamp them together, and between the plates with a non-slipping grip effected by the said edges biting into the belt surfaces in the manner shown in Figure 2.

Any stretch in the belt may be readily taken up from time to time, the hold of the gripping edges being released by leverage on the members C.

I claim:—

1. A machinery belt fastener constructed of two clamping plates arranged in parallel lengthwise relationship and connected together at both ends by means of links positioning them a distance apart and each of which plates is formed of right angular cross-sectional shape, with a pivot pin extending longitudinally from the angle at each end and journalled in one of said links and with one of its members formed with a serrated belt gripping edge, and each of the said plates having points projecting from its external angle, substantially as and for the purposes specified.

2. A machinery belt fastener comprising two clamping members of bell-crank formation, pivot pins extending from each end of the fulcrum-like portion of each clamping member, links connecting the pivot pins of one clamping member with the pivot pins of the other to maintain the clamping members in parallel lengthwise relationship, the free end of the arm of each bell-crank member which is to engage and clamp the belt being provided with a sharpened serrated edge adapted to cut into the belt to prevent slipping between the belt and clamping member, and belt gripping pins positioned on the fulcrum portions of the bell-crank-like members for moving the belt gripping serrated edges of the clamping members closer together upon any tendency of the belt ends to separate.

WALTER BEARD.